US012749611B2

(12) United States Patent
Yamamoto et al.

(10) Patent No.: US 12,749,611 B2
(45) Date of Patent: Sep. 29, 2026

(54) COIL COMPONENT

(71) Applicant: Murata Manufacturing Co., Ltd., Kyoto-fu (JP)

(72) Inventors: Shigeto Yamamoto, Nagaokakyo (JP); Ryota Hashimoto, Nagaokakyo (JP); Hiroyuki Honda, Nagaokakyo (JP); Ken Hayashii, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 784 days.

(21) Appl. No.: 18/298,299

(22) Filed: Apr. 10, 2023

(65) Prior Publication Data

US 2023/0245814 A1 Aug. 3, 2023

Related U.S. Application Data

(63) Continuation of application No. PCT/JP2021/037394, filed on Oct. 8, 2021.

(30) Foreign Application Priority Data

Nov. 4, 2020 (JP) ................................ 2020-184604

(51) Int. Cl.
*H01F 27/28* (2006.01)
*H01F 27/24* (2006.01)
*H01F 41/07* (2016.01)
*H01F 27/29* (2006.01)

(52) U.S. Cl.
CPC ......... *H01F 27/2823* (2013.01); *H01F 27/24* (2013.01); *H01F 41/07* (2016.01); *H01F 27/29* (2013.01)

(58) Field of Classification Search
CPC .... H01F 27/2823; H01F 17/045; H01F 27/29; H01F 17/04; H01F 27/24
USPC .................................................. 336/83, 192
See application file for complete search history.

(56) References Cited

U.S. PATENT DOCUMENTS

2017/0294264 A1* 10/2017 Hashimoto ......... H01F 27/2823
2019/0272940 A1* 9/2019 Hashimoto ........... H01F 17/045
2020/0082970 A1* 3/2020 Hashimoto ............. H01F 17/04
(Continued)

FOREIGN PATENT DOCUMENTS

CN 110223818 A 9/2019
CN 110581006 A 12/2019
JP S52-12105 Y 3/1977
(Continued)

OTHER PUBLICATIONS

International Search Report issued in PCT/JP2021/037394; mailed Jan. 11, 2022.

*Primary Examiner* — Tszfung J Chan
(74) *Attorney, Agent, or Firm* — Studebaker Brackett PLLC

(57) ABSTRACT

A coil component includes a core having a winding core portion; and a coil, wound around the winding core portion, that includes a plurality of wires, in which the coil has a twisted-wire portion formed by twisting a plurality of wires together. The twisted-wire portion is wound around the winding core portion to form one or more layers, and at least one twist pitch of all twist pitches in the twisted-wire portion is different from any other twist pitches within a single layer of the one or more layers.

18 Claims, 4 Drawing Sheets

(56) References Cited

U.S. PATENT DOCUMENTS

| | | | | |
|---|---|---|---|---|
| 2020/0082971 | A1* | 3/2020 | Takahashi | H01F 41/07 |
| 2021/0118608 | A1* | 4/2021 | Kobayashi | H01F 17/045 |

FOREIGN PATENT DOCUMENTS

| | | | |
|---|---|---|---|
| JP | 2006-339250 | A | 12/2006 |
| JP | 2014-216525 | A | 11/2014 |
| JP | 2018-170397 | A | 11/2018 |
| JP | 2019-216145 | A | 12/2019 |
| JP | 2020-120060 | A | 8/2020 |

* cited by examiner

COIL COMPONENT

CROSS-REFERENCE TO RELATED APPLICATIONS

This application claims benefit of priority to International Patent Application No. PCT/JP2021/037394, filed Oct. 8, 2021, and to Japanese Patent Application No. 2020-184604, filed Nov. 4, 2020, the entire contents of each are incorporated herein by reference.

BACKGROUND

Technical Field

The present disclosure relates to a coil component.

Background Art

A conventional coil component is described in Japanese Unexamined Patent Application Publication No. 2014-216525. This coil component includes a core having a winding core portion and a coil, wound around the winding core portion, that includes two wires, and the coil has a twisted-wire portion in which two wires are twisted together.

SUMMARY

It has been found that the following problem needs to be solved to actually manufacture and use the conventional coil component described above.

When the twisted-wire portion is wound around the winding core portion, the formation of the twisted-wire portion has been considered to improve the characteristics of the coil component, such as mode conversion characteristics (Scd21, Sdc21, and noise suppression characteristics). However, there is a concern that excessive twisting of the wires or the like increases the stress on the wires and applies loads on the wires, thereby damaging the coatings of the wires and easily causing irregular winding of the wires. Accordingly, the present disclosure is to provide a coil component that improves the characteristics of the coil component and reduces loads on the wires at the same time.

A coil component according to an aspect of the present disclosure includes a core having a winding core portion; and a coil wound around the winding core portion. The coil includes a plurality of wires, in which the coil has a twisted-wire portion formed by twisting a plurality of wires together. The twisted-wire portion is wound around the winding core portion to form one or more layers, and at least one twist pitch of all twist pitches in the twisted-wire portion is different from any other twist pitches within a single layer of at least one layer of the one or more layers.

Here, the twist pitch is the length from a specific relative position of the plurality of wires to the next same relative position in the state in which the plurality of wires are twisted together. That is, the twist pitch is the length when the positional relationship of the plurality of wires twisted together rotates from 0° to 360°.

In the embodiment described above, a portion having a small twist pitch and a portion having a large twist pitch are present within a single layer. Since a portion having a small twist pitch is present, the number of twists of the twisted-wire portion can be increased, and the characteristics of the coil component such as mode conversion characteristics can be improved. In contrast, since a portion having a large twist pitch is present, the number of twists of the twisted-wire portion can be reduced, and the stress on the wires due to the twisting can be reduced.

Accordingly, the characteristics of the coil component can be improved and loads on the wires can be reduced at the same time.

Preferably, in a coil component according to an embodiment, the twisted-wire portion is continuously wound a plurality of turns around the winding core portion to form one layer.

In the embodiment described above, the characteristics of the coil component can be improved and loads on the wires can be reduced only by providing one layer.

Preferably, in a coil component according to an embodiment, the twisted-wire portion is continuously wound a plurality of turns around the winding core portion to form a first layer and is continuously wound a plurality of turns on the first layer from the first layer to form a second layer.

Since the coil has a two-layer structure in the embodiment described above, the L value can be increased by increasing the number of turns.

Preferably, in a coil component according to an embodiment, a twist pitch of at least one of both ends in a direction in which the winding core portion extends is larger than any other twist pitches.

In the embodiment described above, the number of twists of the twisted-wire portion on at least one of the winding start side and the winding end side of the twisted-wire portion with respect to the winding core portion can be reduced. Accordingly, when the twist pitch of at least one end is larger than any other twist pitches in the routing area from the electrode portions to the winding core portion, the plurality of wires can be loosely twisted on at least one of the winding start side and the winding end side of the twisted-wire portion with respect to the winding core portion, and the stress on the wires due to the twisting can be further reduced.

Preferably, the twist pitch of the twisted-wire portion is smaller toward a middle in the direction in which the winding core portion extends from at least one of both ends in the direction in which the winding core portion extends.

In the structure described above, for example, when the wires are pressure-bonded to electrode portions and the wires are then twisted together, loads on the pressure-bonded portions between the wires and the electrode portions can be reduced by gradually decreasing the twist pitch of the twisted-wire portion toward the middle in the axial direction of the winding core portion from the start of winding, thereby enabling the reliability of connectivity between the wires and the electrode portions to be improved.

In addition, the twist gradually loosens when the twisted-wire portion continues to be wound, but if additional twist is applied during winding to keep the twist pitch constant, an excess load is applied to the end portions of the final turn of the wound wires. Winding around the winding core portion is enabled without such additional winding by gradually increasing the twist pitch of the wound twisted-wire portion toward the end of winding from the middle in the axial direction of the winding core portion, thereby enabling loads on the wires to be reduced.

Preferably, in a coil component according to an embodiment, the twist pitch on a winding start side on which the twisted-wire portion starts being wound around the winding core portion is larger than any other twist pitches.

In the embodiment described above, the number of twists of the twisted-wire portion on the winding start side of the twisted-wire portion with respect to the winding core portion can be reduced. Accordingly, when the plurality of wires are wound around the winding core portion while being twisted together, the wires are twisted loosely at the start of winding around the winding core portion, and thereafter the twist pitch can be decreased gradually. Accordingly, the state of winding of the wires around the winding core portion can be stabilized and loads on the wires can be reduced.

Preferably, in a coil component according to an embodiment, a twist pitch of at least one of both ends in a direction in which the winding core portion extends is smaller than any other twist pitches.

In the embodiment described above, the number of twists of the twisted-wire portion on at least one of the winding start side and the winding end side of the twisted-wire portion with respect to the winding core portion can be increased. This can further improve the characteristics of the coil component.

Preferably, the twist pitch of the twisted-wire portion is larger toward a middle in a direction in which the winding core portion extends from at least one of both ends in the direction in which the winding core portion extends.

In the structure described above, the twist pitch can be decreased on the winding start side and the winding end side on which irregular winding is likely to occur, so the overall winding condition can be stabilized.

Preferably, in a coil component according to an embodiment, a twist pitch on a winding start side on which the twisted-wire portion starts being wound around the winding core portion is smaller than any other twist pitches in the twisted-wire portion.

In the embodiment described above, the number of twists of the twisted-wire portion on the winding start side with respect to the winding core portion can be increased. Accordingly, when the plurality of wires are twisted together and thereafter wound around the winding core portion, the twist pitch can be small at the start of winding around the winding core portion, and thereafter the twist pitch can be gradually increased. Accordingly, the state of winding of the wire around the winding core portion can be stabilized and loads on the wires can be reduced.

Preferably, in a coil component according to an embodiment, the number of twists per turn of the twisted-wire portion is not an integer in at least one turn of the twisted-wire portion.

Here, the number of twists of the twisted-wire portion is one when the positional relationship of the plurality of wires twisted together rotates 360°. For example, when the positional relationship of two wires rotates 180°, that is, when the two wires are replaced with each other, the number of twists is 0.5. When the positional relationship between the wires further rotates 180°, that is, when the positional relationship of the wires returns to the original state, the number of twists is one.

Since the number of twists per turn of the twisted-wire portion is not an integer in the embodiment described above, advanced winding control is not necessary. In addition, since the number of twists per turn of the twisted-wire portion is not an integer and the positional relationship of the plurality of wires for each turn of the twisted-wire portion is not fixed, imbalances in the line capacitance of the twisted-wire portion can be reduced.

Preferably, in a coil component according to an embodiment, the twisted-wire portion has a first block in which a certain twist pitch continues for two or more turns and a second block in which a certain twist pitch that differs from the twist pitch of the first block continues for two or more turns within the single layer of the at least one layer.

Since the twist pitch does not always need to be kept constant in the embodiment described above, advanced winding control is not necessary.

Preferably, in a coil component according to an embodiment, the twisted-wire portion has a reverse portion in which a twist direction is reversed and a twist pitch of the reverse portion is larger than a twist pitch of a turn adjacent to the reverse portion.

Here, the twist direction of the twisted-wire portion is the direction in which the plurality of wires twisted together rotate and is represented as a Z-twist or an S-twist.

In the embodiment described above, since the superposition of twists in the twisted-wire portion can be reduced by providing the reverse portion having a large twist pitch, loads on the wires can be further reduced.

Preferably, in a coil component according to an embodiment, the reverse portion is located between one-third a total number of turns of the twisted-wire portion and two-thirds of a total number of turns of the twisted-wire portion.

In the embodiment described above, since the superposition of twists in the twisted-wire portion can be optimally reduced, loads on the wires can be further reduced.

In the coil component according to the aspect of the present disclosure, the characteristics of the coil component can be improved and loads on the wires can be reduced at the same time.

DETAILED DESCRIPTION

A coil component according to an aspect of the present disclosure will be described in detail below with reference to the illustrated embodiments. It should be noted that some of the drawings are schematic and do not necessarily represent actual dimensions or proportions.

First Embodiment

Figure 1:
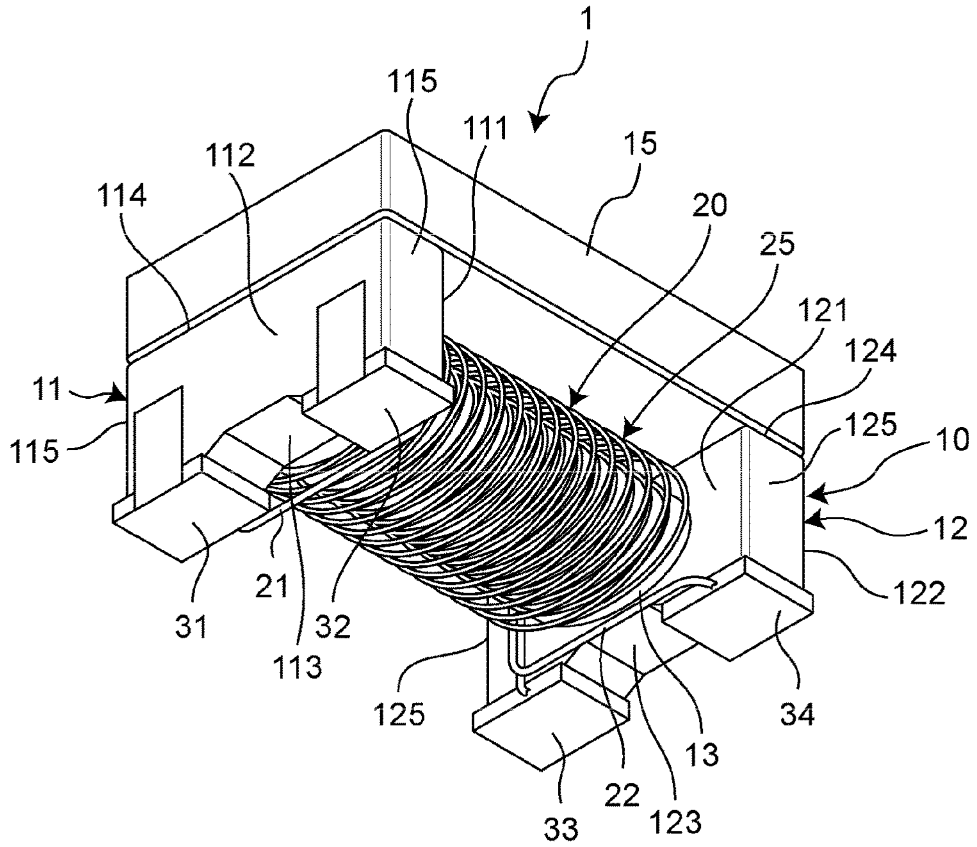
FIG. 1 is a perspective view illustrating a coil component according to a first embodiment as seen from the bottom side.

FIG. 1 is a perspective view illustrating a coil component according to a first embodiment as seen from the bottom side.

As illustrated in FIG. 1, a coil component 1 includes a core 10, a coil 20 wound around the core 10, first, second, third, and fourth electrode portions 31, 32, 33, and 34 as external terminals provided in the core 10 and electrically connected to the coil 20, and a plate member 15 attached to the core 10.

The core 10 has a shape extending in a certain direction and includes a winding core portion 13 around which the coil 20 is wound, a first flange portion 11, that is provided at a first end in a direction in which the winding core portion 13 extends and that projects orthogonally in this direction, and a second flange portion 12 that is provided at a second end in the direction in which the winding core portion 13 extends and that projects orthogonally in this direction. The material of the core 10 is preferably, for example, a magnetic material such as a sintered body of ferrite or a molded body of resin containing magnetic powder but may be a non-magnetic material such as alumina or resin. It should be noted that, in the following description, the lower surface of the core 10 is the surface to be mounted on a mounting board and the surface facing away from the lower surface of the core 10 is the upper surface of the core 10.

The first flange portion 11 has an inner surface 111 facing the winding core portion 13, an outer surface 112 facing away from the inner surface 111, a lower surface 113 connecting the inner surface 111 and the outer surface 112 to each other, an upper surface 114 facing away from the lower surface 113, and two side surfaces 115 connecting the inner surface 111 and the outer surface 112 to each other and connecting the lower surface 113 and the upper surface 114 to each other.

Similarly, the second flange portion 12 has an inner surface 121 facing the winding core portion 13, an outer surface 122 facing away from the inner surface 121, a lower surface 123, an upper surface 124, and two side surfaces 125. The lower surface 123, the upper surface 124, and the side surfaces 125 of the second flange portion 12 face the same directions as in the lower surface 113, the upper surface 114, and side surfaces 115 of the first flange portion 11, respectively. It should be noted that the lower surface and the upper surface are only for illustrative purposes and do not need to actually correspond to the vertically down side and vertically up side.

The plate member 15 is attached to the upper surface 114 of the first flange portion 11 and the upper surface 124 of the second flange portion 12 via an adhesive. The material of the plate member 15 is the same as, for example, the material of the core 10. When the materials of the core 10 and the plate member 15 are a magnetic material, a closed magnetic circuit is formed to improve the inductance acquisition efficiency.

The first flange portion 11 has two leg portions on the side of the lower surface 113, the first electrode portion 31 is provided on one leg portion, and the second electrode portion 32 is provided on the other leg portion. The second flange portion 12 has two leg portions on the side of the lower surface 123, the third electrode portion 33 is provided on one leg portion that is disposed on the same side of the leg portion on which the first electrode portion 31 is provided, and the fourth electrode portion 34 is provided on the other leg portion on the same side of the leg portion on which the second electrode portion 32 is provided.

As illustrated in FIG. 1, the lower surface 113 and the lower surface 123 include the lower surfaces of the leg portions, the inclined portions of forked portions between the leg portions, and the lower surfaces of the forked portions. It should be noted that, in the following description, when the first electrode portion 31, the second electrode portion 32, the third electrode portion 33, and the fourth electrode portion 34 are collectively described, these electrode portions may be referred to as the electrode portion 31 to 34.

The coil 20 includes a first wire 21 and a second wire 22 that have been wound around the winding core portion 13. That is, the coil axis of the coil 20 corresponds to the direction (the axis of the winding core portion 13) in which the winding core portion 13 extends. The first wire 21 and the second wire 22 are insulation-coated conductive wires in which conductive wires made of a metal, such as copper, are covered with coatings made of a resin, such as polyurethane or polyamide imide. The first wire 21 has one end electrically connected to the first electrode portion 31 and the other end electrically connected to the third electrode portion 33. The second wire 22 has one end electrically connected to the second electrode portion 32 and the other end electrically connected to the fourth electrode portion 34. The first wire 21 and the second wire 22 are connected to the electrode portions 31 to 34 via, for example, thermal pressure bonding, brazing, or welding.

The first wire 21 and the second wire 22 are wound in the same direction around the winding core portion 13. Accordingly, when a signal with opposite phases such as a differential signal is input to the first wire 21 and the second wire 22 in the coil component 1, the magnetic fluxes generated by the first wire 21 and the second wire 22 cancel each other to weaken the function of the inductor, thereby allowing the signals to pass through the coil. In contrast, when signals with the same phase, such as external noise, are input to the first wire 21 and the second wire 22, the magnetic fluxes generated by the first wire 21 and the second wire 22 strengthen each other to enhance the function of the inductor, thereby preventing the noise from passing through the coil. Accordingly, the coil component 1 functions as a common mode choke coil that attenuates a common mode signal such as external noise while reducing the passage loss of a differential mode signal such as a differential signal.

When the coil component 1 is mounted on the mounting board, the lower surface 113 of the first flange portion 11 and the lower surface 123 of the second flange portion 12 face the mounting board. At this time, the direction (the axis of the winding core portion 13) in which the winding core portion 13 extends from the first end to the second end is parallel to the main plane of the mounting board. That is, the coil component 1 is a horizontal winding type having the coil axis of the first wire 21 and the second wire 22 that is parallel to the mounting board.

Figure 2A:
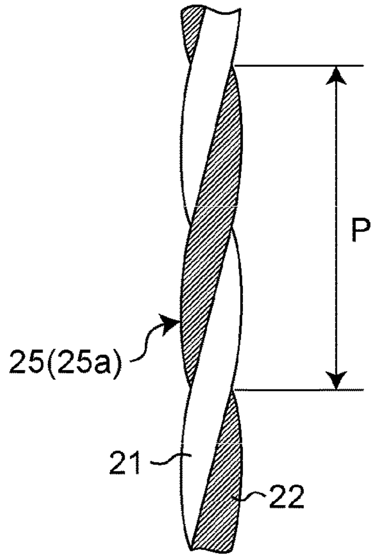
FIG. 2A is an enlarged view of a twisted-wire portion having a Z-twist.
Figure 2B:
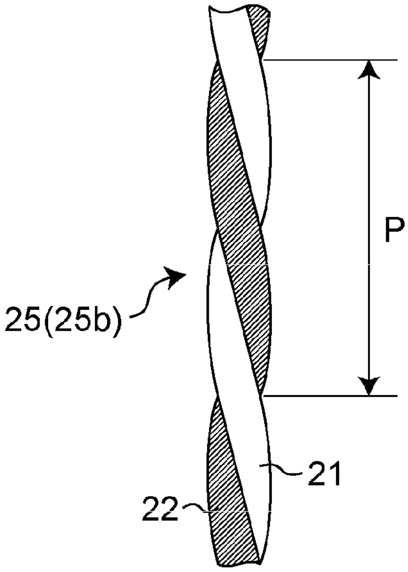
FIG. 2B is an enlarged view of a twisted-wire portion having an S-twist.

The coil 20 has a twisted-wire portion 25 in which the first wire 21 and the second wire 22 are twisted together. FIGS. 2A and 2B are enlarged views of the twisted-wire portion 25. In FIGS. 2A and 2B, the second wire 22 is hatched for convenience. FIG. 2A illustrates a twisted-wire portion 25*a* having a Z-twist and FIG. 2B illustrates a twisted-wire portion 25*b* having an S-twist. The twist direction of the twisted-wire portion 25*a* having a Z-twist is opposite to the twist direction of the twisted-wire portion 25*b* having an S-twist. The twist direction represents the direction in which the first wire 21 and the second wire 22 are twisted together. The first wires 21 and the second wires 22 drawn from the electrode portions 31 to 34 are not twisted until these wires are wound around the winding core portion 13.

As illustrated in FIGS. 2A and 2B, the twisted-wire portion 25 is the portion in which the first wire 21 and the second wire 22 are twisted together. Since the relative differences (deviation in the stray capacitance, line length, and the like) between the two wires are small in the twisted-wire portion 25, a mode conversion output such as an output of a common mode signal converted from a differential mode signal within the coil component 1 or an output of a differential mode signal converted from a common mode signal is reduced, thereby improving mode conversion characteristics.

It should be noted that the first wire 21 and the second wire 22 are twisted together closely in the twisted-wire portions 25 in FIGS. 2A and 2B, but these wires may be twisted while being partially spaced apart or may be twisted while being entirely spaced apart. In the coil component 1, a winding region Z1 of the coil 20 is almost the twisted-wire portion 25. It should be noted that the twist direction of the twisted-wire portion 25 may be a Z-twist, an S-twist, or a mixture of a Z-twist and an S-twist as described later.

As illustrated in FIGS. 2A and 2B, a twist pitch P of the twisted-wire portion 25 is the length from a specific relative position of the first wire 21 and the second wire 22 to the next same relative position with the first wire 21 and the second wire 22 twisted together. That is, the twist pitch P is the length when the positional relationship of the plurality of wires twisted together rotates from 0° to 360°.

In addition, the number of twists of the twisted-wire portion 25 is one when the positional relationship of the first wire 21 and the second wire 22 twisted together rotates 360°. For example, when the positional relationship of the two wires 21 and 22 rotates 180°, that is, when the two wires 21 and 22 are replaced with each other, the number of twists is 0.5. Furthermore, when the positional relationship between the wires rotates 180°, that is, when the positional relationship of the wires 21 and 22 returns to the original state, the number of twists is one.

Figure 3:
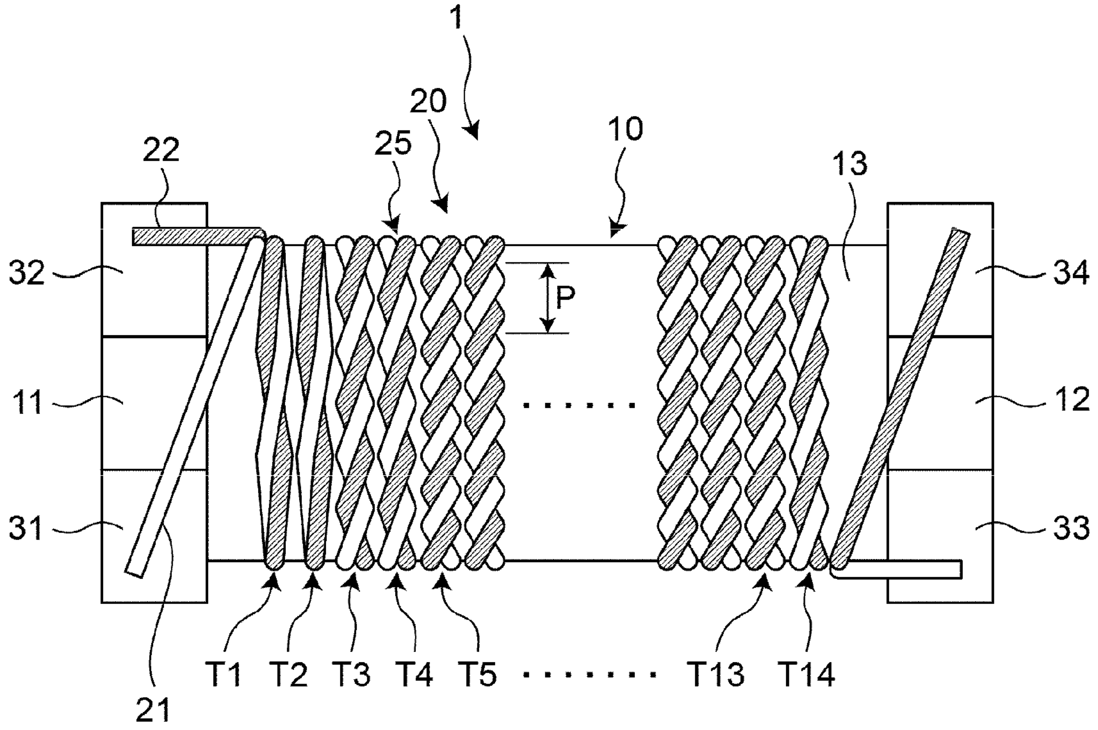
FIG. 3 is a bottom view schematically illustrating the coil component according to the first embodiment.

FIG. 3 is a bottom view schematically illustrating the coil component 1. In FIG. 3, the second wire 22 is hatched for convenience and the plate member 15 is not illustrated. As illustrated in FIG. 3, the twisted-wire portion 25 is continuously wound a plurality of turns around the winding core portion 13 to form one layer. At least one twist pitch P of all twist pitches P in the twisted-wire portion 25 within the one layer is different from any other twist pitches P.

In the structure described above, a portion in which the twist pitch P is small and a portion in which the twist pitch P is large are present within the one layer. Since a portion in which the twist pitch P is small is present, the characteristics of the coil component 1, such as mode conversion characteristics (Scd21, Sdc21, and noise suppression characteristics) can be improved by increasing the number of twists of the twisted-wire portion 25. In contrast, since a portion in which the twist pitch P is large is present, the stress on the wires 21 and 22 due to the twisting can be reduced by reducing the number of twists of the twisted-wire portion 25. Accordingly, the characteristics of the coil component 1 can be improved and loads on the wires 21 and 22 can be reduced at the same time.

Here, when the twisted-wire portion has two layers, if all twist pitches in the twisted-wire portion are identical within a first layer and all twist pitches in the twisted-wire portion are identical within a second layer, the twist pitches within the first layer may be decreased and the twist pitches within the second layer may be increased. When the first layer is wound and thereafter the second layer is wound, loads are applied to the wires in the entire first layer. Alternatively, the second layer may be formed while the first layer is formed, and then the first layer may be formed again after the second layer is formed. However, this requires additional formation of a layer for improving the characteristics and a layer for reducing stress and takes time and effort in manufacturing. In the embodiment, it is possible to improve the characteristics of the coil component and reduce the stress on the wires by providing only one layer and making the twist pitches different within this layer without additionally providing two layers.

Preferably, the twist pitch P of at least one of both ends of the winding core portion 13 is larger than any other twist pitches P. That the twist pitch P of at least one of both ends of the winding core portion 13 is larger than any other twist pitches P includes the case in which the number of twists of the first wire 21 and the second wire 22 is not more than one for each turn in the twist pitch P of at least one of both ends of the winding core portion 13.

In the structure described above, the number of twists of the twisted-wire portion 25 on at least one of the winding start side and the winding end side of the twisted-wire portion 25 with respect to the winding core portion 13 can be reduced. Accordingly, when the twist pitch P of the first wire 21 and the second wire 22 in the routing area from the electrode portions 31 to 34 to the winding core portion 13 is larger than any other twist pitches P, the first wire 21 and the second wire 22 can be loosely twisted on at least one of the winding start side and the winding end side of the twisted-wire portion 25 with respect to the winding core portion 13, and the stress on the wires 21 and 22 due to the twisting can be further reduced.

Preferably, the twist pitch P of the twisted-wire portion 25 decreases toward the middle in the axial direction of the winding core portion 13 from at least one of both ends of the winding core portion 13. At this time, the twist pitch P may decrease continuously or may decrease in a stepwise manner.

In the structure described above, for example, when the first wire 21 and the second wire 22 are pressure-bonded to the electrode portions 31 to 34 and then the first wire 21 and the second wire 22 are twisted together, the pressure-bonded portions between the first wire 21 and the second wire 22 and the electrode portions 31 to 34 have loads, possibly reducing the connectivity between the first wire 21 and the second wire 22 and the electrode portions 31 to 34. The loads on the pressure-bonded portions can be reduced by gradually decreasing the twist pitch P of the wound twisted-wire portion 25 toward the middle in the axial direction of the winding core portion 13 from the start of winding, thereby enabling the reliability of connectivity between the wires 21 and 22 and the electrode portions 31 to 34 to be improved. In addition, the twist gradually loosens when the twisted-wire portion 25 continues to be wound, but if additional twist is applied during winding to keep the twist pitch P constant, an excess load is applied to the end portions of the final turn of the wires 21 and 22. Winding around the winding core portion 13 can be performed without such additional winding by gradually increasing the twist pitch P of the wound twisted-wire portion 25 toward the end of winding from the middle in the axial direction of the winding core portion 13, thereby enabling loads on the wires 21 and 22 to be reduced.

Preferably, the twist pitch P on the winding start side of the twisted-wire portion 25 with respect to the winding core portion 13 is larger than any other twist pitches P. In the embodiment, the twisted-wire portion 25 is wound around the winding core portion 13 toward the second end of the winding core portion 13 close to the second flange portion 12 from the first end of the winding core portion 13 close to the first flange portion 11. Accordingly, the winding start side of the twisted-wire portion 25 is the first end side of the winding core portion 13.

In the structure described above, the number of twists of the twisted-wire portion 25 on the winding start side with respect to the winding core portion 13 can be reduced. Accordingly, when the first wire 21 and the second wire 22 are wound around the winding core portion 13 while being twisted together, the wires 21 and 22 are twisted loosely at the start of winding around the winding core portion 13, and thereafter the twist pitch P can be decreased gradually.

Accordingly, the state of winding of the wires 21 and 22 around the winding core portion 13 can be stabilized and loads on the wires 21 and 22 can be reduced.

In contrast, when an attempt is made to forcibly achieve a predetermined twist pitch from the start of winding of the twisted-wire portion, loads are applied to the wires, the coatings of the wires are damaged, and irregular winding of the wires is likely to occur.

In the embodiment, when the wires are wound around the core while the core is rotated, the core is rotated slowly on the winding start side of the wires, and the rotation speed of the core is gradually increased to a predetermined rotation speed until the winding of the wires becomes stable. This stabilizes the winding state of the wires and reduces loads on the wires. As a result, the twist pitch of the twisted-wire portion is large on the winding start side, and thereafter the twist pitch gradually decreases to a desired value, and the winding state is maintained and stabilized.

Next, the relationship between the turns of the coil 20 and the twist pitch P of the twisted-wire portion 25 will be described. All the turns on the winding core portion 13 of the coil 20 are formed by the twisted-wire portion 25. That is, the twisted-wire portion 25 constitutes the first turn T1 of the coil 20 to the 14th turn T14, which is the final turn. Here, the turn ordinal numbers such as those of the first turn T1, the second turn T2, and the like are determined from the winding start side of the coil 20 with respect to the winding core portion 13 and, in the embodiment, the ordinal numbers are determined from the first flange portion 11.

The twist pitches P of twisted-wire portion 25 parts that constitute the first turn T1 and the second turn T2 are identical to each other and larger than the twist pitches P of twisted-wire portion 25 parts that constitute any other turns. The twist pitches P of twisted-wire portion 25 parts that constitute the third turn T3 and the fourth turn T4 are identical to each other and smaller than the twist pitches P of the twisted-wire portion 25 parts that constitute the first turn T1 and the second turn T2. The twist pitches P of twisted-wire portion 25 parts that constitute the fifth turn T5 and the 13th turn T13 are identical to each other and smaller than the twist pitches P of the twisted-wire portion 25 parts that constitute the third turn T3 and the fourth turn T4. The twist pitch P of the twisted-wire portion 25 part that constitutes the 14th turn T14 is identical to the twist pitches P of the twisted-wire portion 25 parts that constitute the third turn T3 and the fourth turn T4.

It should be noted that only the twist pitch P of the twisted-wire portion 25 part that constitutes the first turn T1 may be larger than the pitches P of twisted-wire portion 25 parts that constitute any other turns. In addition, the twist pitch P of the twisted-wire portion 25 part that constitutes the 14th turn T14 may be identical to the twist pitch P of the twisted-wire portion 25 part that constitutes the 13th turn T13. In addition, the first turn T1 may include the first wire 21 and the second wire 22 parts that run parallel to each other without being twisted together, instead of a twisted-wire portion 25 part.

Preferably, the number of twists per turn of the twisted-wire portion 25 is not an integer in at least one turn of the twisted-wire portion 25. Specifically stated, the number of twists per turn of the twisted-wire portion 25 is not an integer in at least one turn of the first turn T1 to the 14th turn.

In the structure described above, since the number of twists per turn of the twisted-wire portion 25 is not an integer, advanced winding control is not necessary. In addition, since the number of twists per turn of the twisted-wire portion 25 is not an integer and the positional relationship between the plurality of wires 21 and 22 for each turn of the twisted-wire portion 25 is not fixed, imbalances in the line capacitance of the twisted-wire portion 25 can be reduced. For example, in adjacent turns of the twisted-wire portion 25, nodes (or antinodes) do not need to be adjacent to each other.

Preferably, the twisted-wire portion 25 has a first block in which a certain twist pitch continues for two or more turns and a second block in which a certain twist pitch that differs from the twist pitch of the first block continues for two or more turns within a single layer. The twisted-wire portion 25 may have three or more blocks that differ from each other in the twist pitch. Specifically, the first turn T1 and the second turn T2 constitute the first block, and the third turn T3 and the fourth turn T4 constitute the second block. Furthermore, the fifth turn T5 to the 13th turn T13 constitute the third block, and the twist pitch of the third block is different from the twist pitch of the first block and the twist pitch of the second block.

Since the twist pitch does not always need to be kept constant in the structure described above, advanced winding control is not necessary.

Second Embodiment

Figure 4:
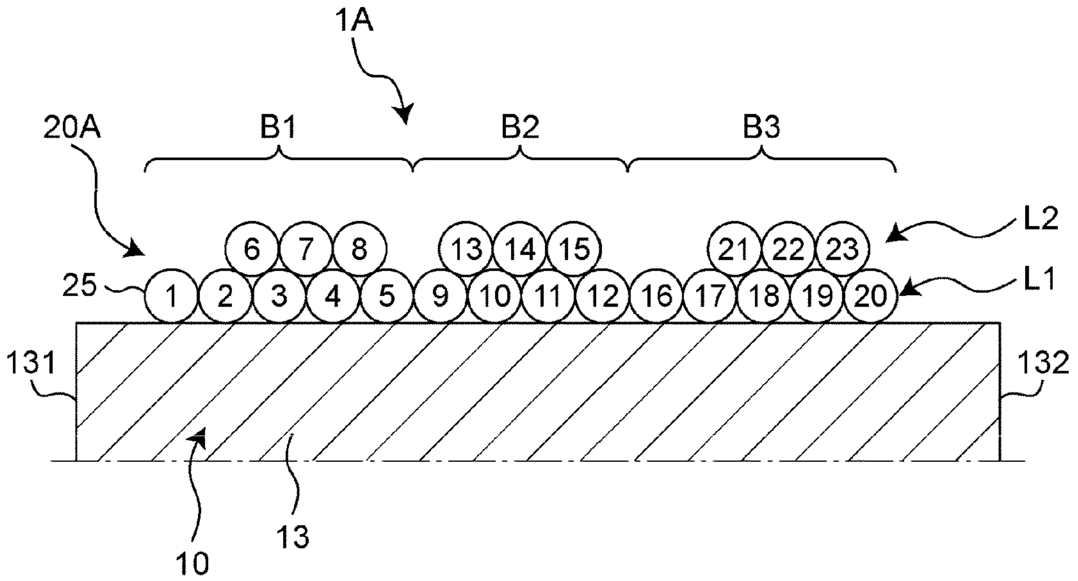
FIG. 4 is a sectional view schematically illustrating a coil component according to a second embodiment.

FIG. 4 is a sectional view schematically illustrating a coil component according to a second embodiment. The difference between the second embodiment and the first embodiment is the structure of the coil. The different in the structure will be described below. The other structure is the same as in the first embodiment and denoted by the same reference numerals to omit description thereof.

FIG. 4 partially illustrates cross sections of the coil 20A and the winding core portion 13 from the first end 131 to the second end 132 of the winding core portion 13, taken along a line that passes through the center of the winding core portion 13 and extends in the direction in which the winding core portion 13 extends. For simplicity, FIG. 4 illustrates the twisted-wire portion 25 as single lines and a cross section thereof is indicated as single circles. In addition, FIG. 4 illustrates, as numerals, the ordinal numbers of the turns counted from the first end 131 of the winding core portion 13 of the coil 20A. That is, a total of 23 turns (from the first turn to the 23rd turn) of the coil 20A are wound from the first end 131 to the second end 132 of the winding core portion 13.

As illustrated in FIG. 4, in the coil 20A of the coil component 1A according to the second embodiment, the twisted-wire portion 25 is continuously wound a plurality of turns around the winding core portion 13 to form a first layer L1 and is continuously wound a plurality of turns on the first layer L1 from the first layer L1 to form a second layer L2. Since the coil 20A has a two-layer structure in the structure described above, the L value can be increased by increasing the number of turns. In addition, desired S parameter characteristics can be obtained under predetermined conditions.

Specifically, the twisted-wire portion 25 has three bank regions B1, B2, and B3 each including a first layer L1 part and a second layer L2 part. The first bank region B1, the second bank region B2, and the third bank region B3 are disposed closely spaced from each other in sequence from the first end 131 to the second end 132 of the winding core portion 13. However, the first to third bank regions B1 to B3 may be spaced apart from each other.

In the first bank region B1, the first layer L1 includes five turns from the first turn to the fifth turn continuously wound around the winding core portion 13, and the second layer L2 includes three turns from the sixth turn to the eighth turn, wound on the second turn to the fifth turn of the first layer L1, that is continuously from the fifth turn of the first layer L1. In the second bank region B2, the first layer L1 includes four turns from the ninth turn to the 12th turn continuously wound around the winding core portion 13, and the second layer L2 includes three turns from the 13th turn to the 15th turn, continuously wound on the ninth turn to the 12th turn of the first layer L1, that is continuous from the 12th turn of the first layer L1. In the third bank region B3, the first layer L1 includes five turns from the 16th turn to the 20th turn continuously wound around the winding core 13, and the second layer L2 includes three turns from the 21st turn to the 23rd turn, continuously wound on the 17th turn to the 20th turn of the first layer L1, that is continuous from the 20th turn.

Here, at least one pitch of all the twist pitches of the twisted-wire portion 25 within a single layer of at least one layer of the two layers formed by the twisted-wire portion 25 is different from any other twist pitches regardless of the bank regions. That is, at least one twist pitch is different from any other twist pitches within a single layer part of at least one layer part of all first layer L1 parts of the first to third bank regions B1 to B3 and all second layer L2 parts of the first to third bank regions B1 to B3.

Third Embodiment

Figure 5:
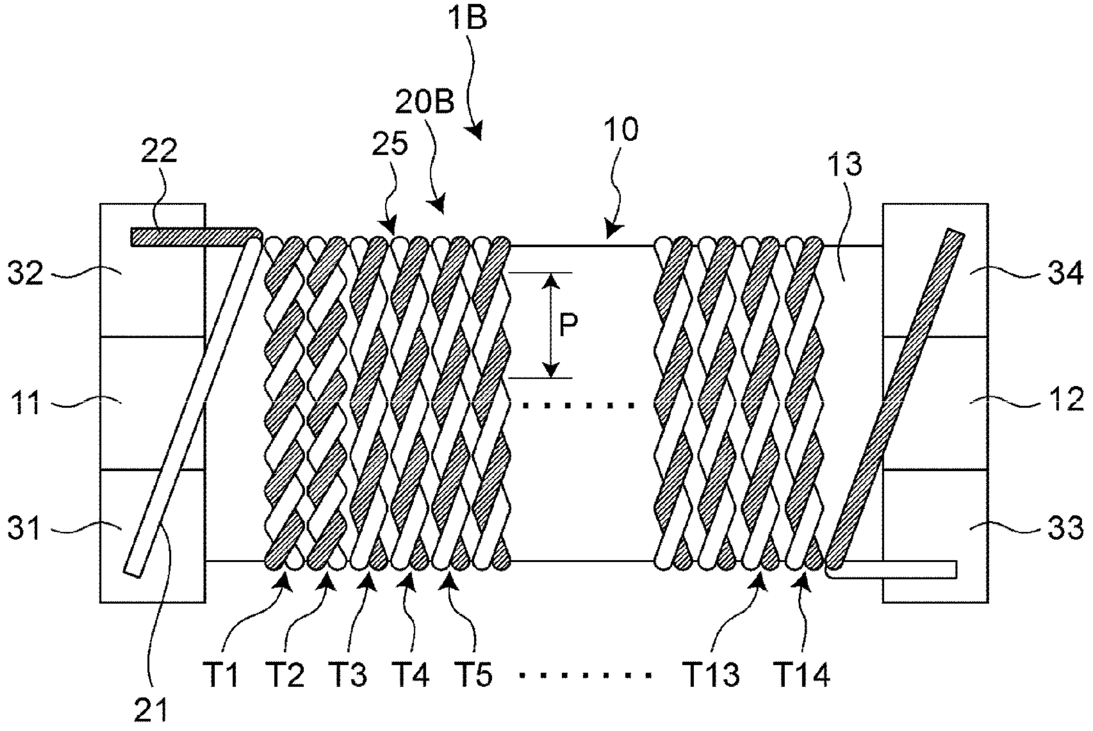
FIG. 5 is a bottom view schematically illustrating a coil component according to a third embodiment.

FIG. 5 is a bottom view schematically illustrating a coil component according to a third embodiment. The difference between the third embodiment and the first embodiment is the structure of the coil. The difference in the structure will be described below. The other structure is the same as in the first embodiment and denoted by the same reference numerals to omit description thereof.

As illustrated in FIG. 5, in a coil 20B of a coil component 1B according to the third embodiment, the twist pitch P of at least one of both ends of the winding core portion 13 is smaller than any other twist pitches P. That the twist pitch P of at least one of both ends of the winding core portion 13 is smaller than any other twist pitches P includes the case in which the number of twists of the first wire 21 and the second wire 22 is not more than one for each turn in the twist pitch P of at least one of both ends of the winding core portion 13.

In the structure described above, the number of twists of the twisted-wire portion 25 on at least one of the winding start side and the winding end side of the twisted-wire portion 25 with respect to the winding core portion 13 can be increased. This can further improve the characteristics of the coil component 1B.

Preferably, the twist pitch P of the twisted-wire portion 25 increases toward the middle in the axial direction of the winding core portion 13 from at least one of both ends of the winding core portion 13. At this time, the twist pitch P may increase continuously or may increase in a stepwise manner.

In the structure described above, the twist pitch P can be decreased on the winding start side and the winding end side on which irregular winding is likely to occur, so the overall winding condition can be stabilized.

Preferably, the twist pitch P on the winding start side (side of the first flange portion 11) of the twisted-wire portion 25 with respect to the winding core portion 13 is smaller than any other twist pitches P.

In the structure described above, the number of twists of the twisted-wire portion 25 on the winding start side with respect to the winding core portion 13 can be increased. Accordingly, when the first wire 21 and the second wire 22 are twisted together and thereafter wound around the core portion 13, the twist pitch P can be small at the start of winding around the core portion 13 and thereafter the twist pitch P can be gradually increased. Accordingly, the state of winding of the wires 21 and 22 around the winding core portion 13 can be stabilized and loads on the wires 21 and 22 can be reduced.

In addition, when the first wire 21 and the second wire 22 are twisted together and thereafter wound around the winding core portion 13, the twisted-wire portion 25 having a predetermined twist pitch is formed before the core 10 is rotated. Accordingly, when strict characteristics are required, the twist pitch P of the twisted-wire portion 25 can be easily decreased at the start of winding of the twisted-wire portion 25 around the winding core portion 13.

Specifically, the twist pitches P of the twisted-wire portion 25 parts that constitute the first turn T1 and the second turn T2 are identical to each other, and are smaller than the twist pitches P of the twisted-wire portion 25 parts that constitute the other turns. The twist pitches P of the twisted-wire portion 25 parts that constitute the third turn T3 to the 14th turn T14 are identical to each other and larger than the twist pitches P of the twisted-wire portion 25 parts that constitute the first turn T1 and the second turn T2.

Fourth Embodiment

Figure 6:
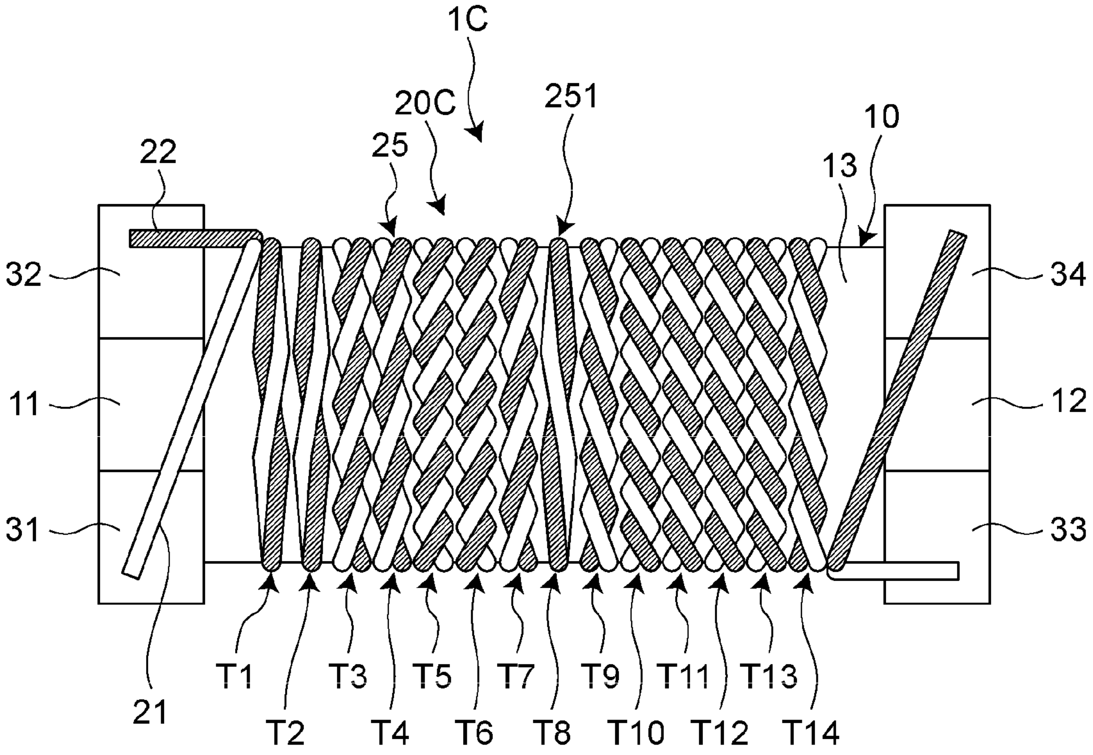
FIG. 6 is a bottom view schematically illustrating a coil component according to a fourth embodiment.

FIG. 6 is a bottom view schematically illustrating a coil component according to a fourth embodiment. The difference between the fourth embodiment and the first embodiment is the structure of the coil. The different in the structure will be described below. The other structure is the same as in the first embodiment and denoted by the same reference numerals to omit description thereof.

As illustrated in FIG. 6, in a coil 20C of a coil component 1C according to the fourth embodiment, the twisted-wire portion 25 has a reverse portion 251 in which the twist direction is reversed. That is, the twist direction changes (or changes from an S-twist to a Z-twist) from a Z-twist to an S-twist in the reverse portion 251.

Preferably, the twist pitch P of the reverse portion 251 is larger than the twist pitches P of turns adjacent to the reverse portion 251. More preferably, in the structure described above in which the twist pitch P of the reverse portion 251 is larger than the twist pitches P of the other portions of the twisted-wire portion 25 except the winding start side (the first flange portion 11 side), by providing the reverse portion 251 having a large twist pitch P, the superposition of twists in the twisted-wire portion 25 can be reduced and loads on the wires 21 and 22 can be further reduced. In addition, except the winding start side and the winding end side of the twisted-wire portion 25, the twist pitch P of the twisted-wire portion 25 can be gradually smaller with distance from the reverse portion 251, the state of winding of the wires 21 and 22 around the winding core portion 13 can be stabilized.

Preferably, the reverse portion 251 is disposed at a position corresponding to one third to two thirds the total number of turns of the twisted-wire portion 25. More preferably, the reverse portion 251 is disposed at a position corresponding to half the total number of turns. In the structure described above, the superposition of twists in the twisted-wire portion 25 can be optimally reduced and loads on the wires 21 and 22 can be further reduced.

Specifically, the reverse portion 251 is disposed in an eighth turn T8. The twist pitch P of the reverse portion 251 is larger than the twist pitches P of a seventh turn T7 and a ninth turn T9, which are adjacent to the reverse portion 251. In addition, the twist pitch P of the reverse portion 251 is larger than the turns except the first turn T1 and the second turn T2 on the winding start side of the twisted-wire portion 25.

It should be noted that the twisted-wire portion 25 may be wound around the winding core portion 13 in two layers, and the reverse portion 251 may be provided in the second layer instead of the first layer. In addition, the twist pitch P of the reverse portion 251 may be identical to the twist pitches P of the turns adjacent to the reverse portion 251.

(Modifications)

It should be noted that the present disclosure is not limited to the embodiments described above, and the design thereof can be changed within the scope of the present disclosure. For example, characteristic points of the first to fourth embodiments may be combined variously.

The coil component is used as a common mode choke coil in the embodiments described above, but the coil component may be used as a winding coil in which a plurality of wires are wound around the winding core portion, such as a transformer and a coupled inductor array. Reduction in the line capacitance is also enabled in these winding coils.

The plate member is provided in the embodiments described above, but the plate member may be omitted. The coil includes two wires in the embodiments described above, but the coil only needs to include a plurality of wires and may include three or more wires. In this case, the number of wires twisted together in the twisted-wire portion is not limited to two and may be three or more.

The twisted-wire portion is wound around the winding core portion in one or two layers in the embodiments described above, but the twisted-wire portion may be wound around the winding core portion in three or more layers. At this time, at least one twist pitch of all twist pitches in the twisted-wire portion is different from any other twist pitches within a single layer of at least one layer of all layers. In addition, preferably, within a single layer of at least one layer of all layers, the twisted-wire portion has the first block in which two or more turns having a certain twist pitch continue and the second block in which two or more turns having a certain twist pitch that differs from the certain twist pitch of the first block continue.

All twist pitches are identical to each other within a single turn of the twisted-wire portion in the embodiments described above, but at least one twist pitch may be different from any other twist pitches.

The twisted-wire portion is present in a region in which the wires are wound around the winding core portion in the embodiments but may be present in a region in which the wires are not wound around the winding core portion. For example, the twisted-wire portion may exist in the routing region from the external terminals (electrode portions) to the winding core portion.

What is claimed is:

1. A coil component comprising:

a core having a winding core portion; and a coil wound around the winding core portion, the coil including a plurality of wires, wherein the coil has a twisted-wire portion configured by twisting the plurality of wires together, the twisted-wire portion is wound around the winding core portion to configure one or more layers, at least one twist pitch of all twist pitches in the twisted-wire portion is different from any other twist pitches within a single layer of at least one layer of the one or more layers, the twisted-wire portion has a reverse portion in which a twist direction is reversed and a twist pitch of the reverse portion is larger than a twist pitch of a turn adjacent to the reverse portion.

2. The coil component according to claim 1, wherein the twisted-wire portion is continuously wound a plurality of turns around the winding core portion to configure one layer.

3. The coil component according to claim 1, wherein the twisted-wire portion is continuously wound around the winding core portion to configure a first layer and is continuously wound on the first layer to configure a second layer.

4. The coil component according to claim 1, wherein a twist pitch of at least one of both ends in a direction in which the winding core portion extends is larger than any other twist pitches.

5. The coil component according to claim 4, wherein the twist pitch of the twisted-wire portion is smaller toward a middle in the direction in which the winding core portion extends from at least one of both ends in the direction in which the winding core portion extends.

6. The coil component according to claim 4, wherein a twist pitch on a winding start side on which the twisted-wire portion starts being wound around the winding core portion is larger than any other twist pitches in the twisted-wire portion.

7. The coil component according to claim 1, wherein a twist pitch of at least one of both ends in a direction in which the winding core portion extends is smaller than any other twist pitches.

8. The coil component according to claim 7, wherein the twist pitch of the twisted-wire portion is larger toward a middle in a direction in which the winding core portion extends from at least one of both ends in the direction in which the winding core portion extends.

9. The coil component according to claim 7, wherein a twist pitch on a winding start side on which the twisted-wire portion starts being wound around the winding core portion is smaller than any other twist pitches in the twisted-wire portion.

10. The coil component according to claim 1, wherein a number of twists per turn of the twisted-wire portion is not an integer in at least one turn of the twisted-wire portion.

11. The coil component according to claim 1, wherein the twisted-wire portion has a first block in which a certain twist pitch continues for two or more turns and a second block in which a certain twist pitch that differs from the twist pitch of the first block continues for two or more turns within the single layer of the at least one layer.

12. The coil component according to claim 1, wherein the reverse portion is located between one-third and two-thirds of a total number of turns of the twisted-wire portion.

13. The coil component according to claim 2, wherein a twist pitch of at least one of both ends in a direction in which the winding core portion extends is larger than any other twist pitches.

14. The coil component according to claim 5, wherein a twist pitch on a winding start side on which the twisted-wire portion starts being wound around the winding core portion is larger than any other twist pitches in the twisted-wire portion.

15. The coil component according to claim 2, wherein a twist pitch of at least one of both ends in a direction in which the winding core portion extends is smaller than any other twist pitches.

16. The coil component according to claim 8, wherein a twist pitch on a winding start side on which the twisted-wire portion starts being wound around the winding core portion is smaller than any other twist pitches in the twisted-wire portion.

17. The coil component according to claim 2, wherein a number of twists per turn of the twisted-wire portion is not an integer in at least one turn of the twisted-wire portion.

18. The coil component according to claim 2, wherein the twisted-wire portion has a first block in which a certain twist pitch continues for two or more turns and a second block in which a certain twist pitch that differs from the twist pitch of the first block continues for two or more turns within the single layer of the at least one layer.

* * * * *